United States Patent
Barghoorn et al.

(10) Patent No.: US 6,566,457 B2
(45) Date of Patent: May 20, 2003

(54) IMPACT MODIFIERS PREPARED FROM (PARTIALLY) HYDROGENATED BUTADIENE-CONTAINING DISPERSIONS

(75) Inventors: Peter Barghoorn, Kallstadt (DE); Volker Schädler, Mannheim (DE); Heiko Maas, Mannheim (DE); Norbert Niessner, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/825,957

(22) Filed: Apr. 5, 2001

(65) Prior Publication Data

US 2002/0004565 A1 Jan. 10, 2002

(30) Foreign Application Priority Data

Apr. 18, 2000 (DE) .......................................... 100 19 215

(51) Int. Cl.[7] .............................. C08F 8/04; C07C 5/05
(52) U.S. Cl. ....................... 525/339; 525/338; 525/191; 525/88; 526/93; 585/273; 585/275; 585/277
(58) Field of Search ................................ 525/339, 338, 525/902, 191, 88; 526/93; 585/273, 275, 277

(56) References Cited

U.S. PATENT DOCUMENTS

| 4,452,950 A | 6/1984 | Widemann .................. 525/339 |
| 4,469,849 A | 9/1984 | Murrer et al. .............. 525/339 |
| 5,486,562 A | * 1/1996 | Borman et al. |

FOREIGN PATENT DOCUMENTS

| DE | 31 49 046 | 6/1983 |
| DE | 197 53 302 | 6/1999 |

* cited by examiner

Primary Examiner—James J. Seidleck
Assistant Examiner—Olga Asinovsky
(74) Attorney, Agent, or Firm—Keil & Weinkauf

(57) ABSTRACT

The invention relates to a process for preparing graft rubbers built up from at least one graft core and from at least one graft shell, comprising
a) preparing an aqueous dispersion of at least one elastomeric polymer,
b) then, to obtain the at least one graft core, selectively hydrogenating ethylenically unsaturated double bonds in the elastomeric polymer, using hydrogen, in the presence of at least one hydrogenation catalyst, where the aqueous dispersion of the elastomeric polymer comprises not more than 20% by volume of an organic solvent, and
c) grafting onto the graft core at least one graft shell, and also to the corresponding graft rubbers.

The invention further relates to blends comprising
a) from 2 to 70% by weight of a graft rubber according to the invention, as component A,
b) from 30 to 98% by weight of a thermoplastic polymer or of a mixture of various thermoplastic polymers, as component B, and
c) from 0 to 50% by weight of other additives, as component C, where the entirety of components A to C is 100% by weight, based on the blend.

18 Claims, No Drawings

IMPACT MODIFIERS PREPARED FROM (PARTIALLY) HYDROGENATED BUTADIENE-CONTAINING DISPERSIONS

The invention relates to a process for preparing graft rubbers based on (partially) hydrogenated diene-containing dispersions, to a graft rubber which can be prepared by this process, to the use of this graft rubber as impact modifier in thermoplastic blends, to blends comprising this graft rubber, and to a process for their preparation, and also to the use of the blends.

Polymeric materials are used in many different applications, for example in the automotive sector, as a material for pipelines, as insulators for electrical wiring, and as protective coatings. A requirement for applications in these sectors is that the polymeric materials retain their advantageous mechanical and physical properties for a very long period, even when exposed to extreme ambient conditions. Polymeric materials which contain reactive carbon—carbon double bonds are particularly susceptible to oxidative decomposition, leading to structural instability of these polymeric materials.

For example, in the case of what are known as ABS (acrylonitrile-butadiene-styrene) polymers, diene-based graft rubbers are used as impact-modifying rubber. The resultant products have good impact strength but relatively low weathering resistance and aging resistance. If the intention is to obtain polymers which are not only impact-resistant but also at the same time weathering- and aging-resistant, saturated rubbers have to be used as impact-modifying rubber. The elastomeric, preferably crosslinked, acrylate polymers have proven particularly suitable for this purpose. The corresponding molding compositions are called ASA (acrylonitrile-styrene-acrylate) polymers.

When acrylate polymers are compared with diene polymers for use as impact modifiers, disadvantages are that the acrylates used as monomers are more expensive than dienes, and that the low-temperature impact strength is lower. DE-A 31 49 046 relates to weathering-resistant thermoplastic molding compositions built up from a two-part elastomer phase which has a core made from a polybutadiene rubber and a shell made from a polyacrylate rubber. Onto this has been grafted a graft shell made from a hard component based on a styrene copolymer. However, these molding compositions have the expensive polyacrylate rubber alongside a butadiene rubber.

U.S. Pat. No. 4,452,950 relates to a process for preparing a polymeric material which has relatively high resistance to oxidative or thermal degradation. This increased resistance is achieved through hydrogenating unsaturated polymers which have carbon—carbon double bonds, after they have been prepared in aqueous dispersion (latex), using hydrazine or hydrates thereof. However, hydrogenation with hydrazine is problematic since hydrazine is toxic. U.S. Pat. No. 5,068,313 therefore relates to a process for minimizing hydrazine residues in polymer dispersions. Although this method can reduce the amount of hydrazine to a minimum, it necessitates a two-stage process following the hydrogenation.

U.S. Pat. No. 4,469,849 relates to a process for the complete or partial hydrogenation of ABS polymers, using hydrogen, in the presence of a catalyst. For this, a generally aqueous emulsion is first prepared of the ABS polymer to be hydrogenated. This is followed by hydrogenation of the polymer, the hydrogenation catalyst being dissolved in a water-immiscible solvent which at the same time serves to swell the polymer so as to give the catalyst readier access to the double bonds to be hydrogenated. The amount of solvent added is sufficient to give a two-phase mixture, one phase comprising the catalyst and the other phase comprising the (partially) hydrogenated ABS polymer. After separation of the phases, an emulsion of the (partially) hydrogenated ABS polymer is obtained.

DE-A 197 53 302 relates to a process for selectively hydrogenating carbon—carbon double bonds in polymers. For this, the dispersion comprising a polymer and not more than 20% by volume of an organic solvent is reacted with hydrogen in the presence of a hydrogenation catalyst. No disclosure is made of the preparation of graft rubbers which are used as impact modifiers in thermoplastic blends.

It is an object of the present invention to provide a process which is inexpensive and simple to carry out for the preparation of diene-based graft rubbers which are suitable as impact modifiers and have high resistance to environmental influences, and also to provide the corresponding graft rubbers having good mechanical properties and high resistance to environmental influences, e.g. in relation to color changes.

We have found that this object is achieved by means of a process for preparing graft rubbers built up from at least one graft core and from at least one graft shell, comprising a) preparing an aqueous dispersion of at least one elastomeric polymer built up from
   at least one conjugated diene,
   where appropriate, at least one monomer copolymerizable with the diene, and
   where appropriate, at least one modifying monomer, b) then, to obtain the graft core, selectively hydrogenating ethylenically unsaturated double bonds in the elastomeric polymer, using hydrogen, in the presence of at least one hydrogenation catalyst selected from salts and complexes of rhodium and/or of ruthenium, where the aqueous dispersion of the elastomeric polymer comprises not more than 20% by volume of an organic solvent, and c) grafting onto the graft core at least one graft shell built up from
   at least one styrene compound of the formula I

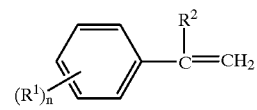

(I)

where $R^1$ and $R^2$ are hydrogen or $C_1$–$C_8$-alkyl and n is 0, 1, 2 or 3,
where appropriate, at least one monoethylenically unsaturated nitrile compound, and
where appropriate, at least one other monomer.

In the process of the invention, an aqueous dispersion of at least one elastomeric diene polymer is first prepared, and the polymer is (partially) hydrogenated, using hydrogen, on a catalyst. The resultant polymer forms the graft core onto which the graft shell is then grafted. The process is simple to carry out and the graft rubbers obtained are resistant to environmental influences and suitable for use as impact modifiers.

The graft rubber prepared by the process of the invention includes from 30 to 90% by weight, preferably from 40 to 80% by weight, particularly preferably from 50 to 75% by weight, of the elastomeric graft core and from 10 to 70% by weight, preferably from 20 to 60% by weight, particularly preferably from 25 to 50% by weight, of the graft shell, where the entirety of graft core and graft shell gives 100% by weight, based on the graft rubber, and where the graft core and the graft shell may be composed of two or more graft cores and graft shells.

a) Preparation of an Aqueous Dispersion of at Least One Elastomeric Polymer

The elastomeric polymer has the following components from 10 to 100% by weight, preferably from 20 to 95% by weight, particularly preferably from 50 to 90% by weight, of at least one conjugated diene, from 0 to 90% by weight, preferably from 5 to 80% by weight, particularly preferably from 10 to 50% by weight, of at least one monomer copolymerizable with the diene, and from 0 to 20% by weight, preferably from 1 to 15% by weight, particularly preferably from 1 to 10% by weight, of at least one modifying monomer, where the entirety of the compounds gives 100% by weight, based on the elastomeric polymer.

Suitable aqueous dispersions of elastomeric polymers are either those prepared from aqueous monomer emulsions by free-radical polymerization (primary dispersions) or those whose polymers are prepared in another way and then converted into a n aqueous dispersion (secondary dispersions).

Monomers

Dienes

The dienes used may be any of the usual dienes. Preference is given to the use of dienes selected from butadiene, isoprene, chloroprene, 1-methylbutadiene, 2,3-dimethylbutadiene, 2-(tri-$C_1$–$C_4$-alkyl)silylbutadiene, such as 2-triethylsilyl-1,3-butadiene, and mixtures of these. Particular preference is given to butadiene and isoprene, and butadiene is very particularly preferred.

Monomers Copolymerizable with the Diene

The elastomeric polymer may have been built up from other monomers copolymerizable with the diene, as well as from the diene itself. Suitable monomers are generally those selected from ethylene, propylene, vinylaromatic monomers, e.g. styrene, α-methylstyrene, o-chlorostyrene or vinyltoluenes, vinyl esters of aliphatic or branched $C_1$–$C_{18}$ monocarboxylic acids, e.g. vinyl acetate, vinyl propionate, vinyl butyrate, vinyl valerate, vinyl hexanoate, vinyl 2-ethylhexanoate, vinyl decanoate, vinyl laurate and vinyl stearate, esters, preferably those made from ethylenically unsaturated mono- or dicarboxylic acids having from 3 to 6 carbon atoms, e.g. acrylic acid, methacrylic acid, maleic acid, fumaric acid or itaconic acid, with alkanols generally having from 1 to 12 carbon atoms, preferably from 1 to 8 carbon atoms, particularly preferably from 1 to 4 carbon atoms, e.g. methanol, ethanol, n-propanol, isopropanol, 1-butanol, 2-butanol, isobutanol, tert-butanol, n-hexanol, 2-ethylhexanol or from C5–C10 cycloalkanols, e.g. cyclopentanol or cyclohexanol, preference being given to the esters of acrylic acid and methacrylic acid, e.g. methyl methacrylate, n-butyl methacrylate, tert-butyl methacrylate, n-butyl acrylate, 2-ethylhexyl acrylate and tert-butyl acrylate. Suitable monomers may also be selected from ethylenically unsaturated nitriles, e.g. acrylonitrile and methacrylonitrile. Preferred monomers polymerizable with the diene are styrene, o-methylstyrene and acrylonitrile.

Modifying Monomers

Modifying monomers may also be used to build up the elastomeric polymers. The modifying monomers include monomers which have relatively high water-solubility, e.g. >60 g/l at 25° C. Suitable monomers with relatively high water solubility are those selected from the abovementioned ethylenically unsaturated carboxylic acids, preferably acrylic acid, methacrylic acid, maleic acid and itaconic acid, from the amides of the abovementioned ethylenically unsaturated carboxylic acids, e.g. acrylamide and methacrylamide, from the alkylolamides of the abovementioned ethylenically unsaturated carboxylic acids, e.g. N-methylolacrylamide and N-methylolmethacrylamide, from the hydroxyalkyl esters of the abovementioned ethylenically unsaturated carboxylic acids, e.g. 2-hydroxyethyl acrylate and 2-hydroxyethyl methacrylate, from ethylenically unsaturated sulfonic acids and the alkali metal salts of these, e.g. vinylsulfonic acid, allylsulfonic acid, methallylsulfonic acid and acrylamido-2-methylpropane-sulfonic acid, or from N-vinyllactams, e.g. N-vinylpyrrolidone or vinylcaprolactam.

Other suitable modifying monomers are monomers which have at least two nonconjugated ethylenically unsaturated double bonds. Suitable monomers having at least two nonconjugated ethylenically unsaturated double bonds are those selected from diesters of dihydric alcohols with ethylenically unsaturated monocarboxylic acids, e.g. alkylene glycol diacrylates and dimethacrylates, such as ethylene glycol di(meth)acrylate, 1,3-butylene glycol di(meth)acrylate, 1,4-butylene glycol di(meth)acrylate, propylene glycol di(meth)acrylate, and also divinylbenzene, vinyl methacrylate, vinyl acrylate, allyl methacrylate, allyl acrylate, diallyl maleate, diallyl fumarate, diallyl phthalate, methylenebisacrylamide, dihydrodicyclopentadienyl acrylate, dihydrodicyclopentadienyl methacrylate, N,N'-divinylimidazolin-2-one and triallyl cyanurate.

Modifying monomers whose use is particularly preferred are acrylic acid, methacrylic acid, itaconic acid, acrylamide, methacrylamide, N-methylolacrylamide and N-methylolmethacrylamide.

It is particularly preferable to use dispersions of elastomeric polymers built up from butadiene or isoprene, preferably butadiene, as diene component, and from styrene or acrylonitrile or methacrylonitrile or isobutene, or from (meth)acrylates as monomers copolymerizable with the diene.

Preferred monomer combinations made from diene component and monomers copolymerizable with the diene are butadiene and/or isoprene with styrene and/or α-methylstyrene, butadiene and isoprene with acrylonitrile and/or methacrylonitrile, butadiene with acrylonitrile and styrene, butadiene with isoprene, and butadiene with alkyl (meth)acrylates.

Very particularly preferred monomer combinations for preparing elastomeric polymers are from 20 to 100% by weight of a diene component selected from butadiene and isoprene, and from 0 to 80% by weight of at least one monomer copolymerizable with the diene and selected from styrene, α-methylstyrene and acrylonitrile, where the proportions of the diene and of the monomer copolymerizable with the diene give 100% by weight in total. These elastomeric polymers may, of course, comprise the abovementioned amounts of modifying monomers incorporated into the polymer, specifically up to 10% by weight, based on the total amount of monomers (diene, monomer copolymerizable with the diene, and modifying monomer). Preferred modifying monomers are acrylic acid, methacrylic acid, itaconic acid, acrylamide, methacrylamide, N-methylolacrylamide and N-methylolmethacrylamide.

Preparation of the Elastomeric Polymers

The preparation of the elastomeric polymers is known to the skilled worker and can take place as described in DE-A 197 53 302, EP-A 0104 899 and NE 6817097. In principle, the polymerization may be a free-radical polymerization carried out in bulk or in aqueous solution, in suspension or in emulsion. Depending on the type of polymerization, the conjugated dienes present are 1,4-polymerized and/or 1,2-polymerized. In the process of the invention it is preferable to use polymers which were prepared by free-radical aqueous emulsion polymerization (including mini- and microemulsion polymerization) or suspension polymerization (including microsuspension polymerization) of the above-mentioned monomers. These processes are described in the literature, for example in Ullmanns Encyclopedia of Industrial Chemistry, $5^{th}$ ed., Vol. A21, p. 373–393. These emulsion polymerizations are usually carried out in the presence of free-radical initiators and, where appropriate, of surface-active substances, such as emulsifiers and protective colloids (see, for example, Houben-Weyl, Methoden der organischen Chemie, Vol. XIV/1, Makromolekulare Stoffe, Georg-Thieme-Verlag, Stuttgart 1961, p. 192–208).

Polymerization Initiators

Suitable free-radical polymerization initiators include organic peroxides, such as tert-butyl hydroperoxide, benzoyl hydroperoxide and diisopropyl benzoyl peroxide, inorganic peroxides, such as hydrogen peroxide, salts of peroxomono- and/or peroxodisulfuric acid, preferably the ammonium and/or alkali metal peroxodisulfates (persulfates), and also azo compounds, the persulfates being particularly preferred. In another preferred embodiment, use is made of combined systems which are composed of at least one organic reducing agent and of at least one peroxide and/or hydroperoxide, e.g. tert-butyl hydroperoxide and sodium hydroxymethanesulfinate, or hydrogen peroxide and ascorbic acid (as electrolyte-free redox initiator system) or combined systems which in addition comprise a small amount of a metal compound soluble in the polymerization medium and whose metallic component may occur in more than one valence state, e.g. ascorbic acid/iron(II) sulfate/hydrogen peroxide, where instead of ascorbic acid use is also frequently made of sodium hydroxymethanesulfinate, sodium sulfite, sodium hydrogensulfite or sodium bisulfite, and instead of hydrogen peroxide it is also possible to use tert-butyl hydroperoxide, alkali metal peroxosulfates and/or ammonium peroxodisulfate. Instead of a water-soluble iron (II) salt it is also possible to use a combination of water-soluble iron/vanadium salts.

The usual amounts of the polymerization initiators are used, generally from 0.01 to 5% by weight, preferably from 0.1 to 2.0% by weight, based on the monomers to be polymerized.

Polymerization Regulators

The monomer mixture may, where appropriate, be polymerized in the presence of conventional polymerization regulators, such as mercaptans, e.g. tert-dodecyl mercaptan, terpinols or Co(II) complexes. The amount preferably used of these is from 0.01 to 5% by weight, based on the total amount of the mixture.

Emulsifiers

There are no particular restrictions with respect to the emulsifiers which may be used. It is preferable to use neutral emulsifiers, such as ethoxylated mono-, di- or trialkylphenols (EO number (degree of ethoxylation): from 3 to 5, alkyl: $C_4$–$C_9$), or ethoxylated fatty alcohols (EO number: from 3 to 5, alkyl: $C_8$–$C_{34}$) and/or anionic emulsifiers, such as the alkali metal or ammonium salts of fatty acids (alkyl: $C_{12}$–$C_{24}$), or of sulfuric half-esters of ethoxylated alkanols (EO number: from 4 to 30, alkyl: $C_8$–$C_{22}$) or of ethoxylated alkylphenols (EO number: from 3 to 50, alkyl: $C_4$–$C_{10}$), or the alkali metal or ammonium salts of alkylsulfonic acids (alkyl: $C_8$–$C_{22}$) or of alkylarylsulfonic acids (alkyl: $C_4$–$C_{18}$). Other anionic emulsifiers which may be used are the alkali metal or ammonium salts of mono- or di-$C_4$–$C_{24}$-alkyl derivatives of bis(phenylsulfonic acid) ether, e.g. industrial mixtures which comprise from 50 to 80% of the monoalkylated product. Emulsifiers of this type are known from U.S. Pat. No. 4,269,749, and the industrial mixtures are commercially available as Dowfax®2A 1 (Dow Chemical), for example.

Particular preference is given to the alkali metal and/or ammonium salts, in particular the sodium salts of alkylarylsulfonic acids, of alkylsulfonic acids (e.g. sulfonated $C_{12}$–$C_{18}$ paraffin, available commercially from Bayer AG as emulsifier K30), of alkylsulfates (e.g. sodium laurylsulfonate available commercially as Texapon®K12 from Henkel KgaA). Other suitable emulsifiers are the sodium or potassium salts of fatty acids ($C_{12}$–$C_{23}$-alkyl), e.g. potassium oleate. Other suitable emulsifiers are found in Houben-Weyl, Methoden der organischen Chemie, Vol. XIV/1, Makromolekulare Stoffe, Georg-Thieme-Verlag, Stuttgart, 1961, p. 192–208. Instead of emulsifiers, or mixed with these, it is also possible to use conventional protective colloids, such as polyvinyl alcohol, polyvinylpyrrolidone or amphiphilic block polymers with short hydrophobic blocks, for costabilization. The amount used of emulsifiers is generally not more than 5% by weight, based on the monomers to be polymerized.

Polymerization Process

The free-radical polymerization may be carried out by charging the entire mixture (a batch process) or by a feed process. Both the batch process and the feed process are also suitable on an industrial scale. In the feed process, most (generally from 50 to 100% by weight) of the amount of monomers to be polymerized is added to the polymerization vessel as required by the progress of polymerization of the monomers previously added to the polymerization vessel. In this process, the free-radical initiator system may either be entirely an initial charge within the polymerization vessel, or else may be fed continuously or in stages into the polymerization reaction as required by its consumption in the course of the free-radical aqueous emulsion polymerization. The details depend in a known manner on both the chemical nature of the initiator system and on the polymerization temperature. It is preferable for the initiator system to be fed as required by consumption in the polymerization reaction.

The polymerization reaction may be carried out in the presence of an aqueous polymer dispersion as polymer seed (seed latex). Processes of this type are known in principle to the skilled worker and are described in DE-A 42 13 967, DE-A 42 13 968, EP-A 0 567 811, EP-A 0 567 812 or EP-A 0 567 819, for example, the full scope of which is incorporated herein by way of reference. In principle, depending on the properties required, the seed can be an initial charge or added during the polymerization continuously or in stages. It is preferable for the polymerization to take place with the seed as an initial charge. The amount of seed polymer is preferably within the range from 0.05 to 5% by weight, particularly preferably from 0.1 to 2% by weight, very particlarly preferably from 0.2 to 1% by weight, based on the monomers used. The polymer particles of the seed latex used preferably have weight-average particle diameters within the range from 10 to 100 nm, particularly preferably from 20 to 60 nm, very particularly preferably of about 30 nm. It is preferable to use a polystyrene seed.

The polymerization reaction is preferably carried out under pressure. The polymerization time may vary over a wide range. It is generally within the range from 1 to 150 hours, preferably from 3 to 40 hours. The polymerization temperature is also variable over a wide range. Depending on the initiator used, it is from about 0 to 110° C.

The dispersions comprising elastomeric polymers and prepared as in the process described generally have solids contents of up to 75% by weight. Particular importance attaches to dispersions of elastomeric polymers with solids contents of from 30 to 70% by weight. Dispersions with the solids contents mentioned can be used in the hydrogenation (step b) which follows. However, where appropriate the dispersions have to be diluted to a suitable solids content. The solids content of the dispersions used in step b) of the process of the invention is preferably within the range from 10 to 60% by weight, particularly preferably from 20 to 50% by weight, based on the total weight of the dispersion.

The surface-active substances generally still present in the polymer dispersions have no adverse effect on the hydrogenation process which follows, and nor do the other substances used, for example, as conventional auxiliaries in emulsion polymerizations. However, it is also possible for the polymer dispersion to be chemically or physically deodorized prior to hydrogenation. EP-A 0 584 458, for example, discloses physical deodorization by stripping residual monomers, using steam. EP-A 0 327 006 on the other hand recommends the use of conventional distillation processes. Chemical deodorization preferably takes place by postpolymerization following the main polymerization. Processes of this type are described in DE-A 38 34 734, EP-A 0 379 892, EP-A 0 327 006, DE-A 44 19 518, DE-A 44 35 422 and DE-A 44 35 423, for example.

b) Selective Hydrogenation of Ethylenically Unsaturated Double Bonds in the Elastomeric Polymer, Using Hydrogen Following the preparation of the elastomeric polymer (step a), and to obtain the graft core, selective hydrogenation of ethylenically unsaturated double bonds in the elastomeric polymer takes place, using hydrogen, in the presence of at least one hydrogenation catalyst selected from salts and complexes of rhodium and/or of ruthenium, where the aqueous dispersion of the elastomeric polymer comprises not more than 20% by volume of an organic solvent.

Hydrogenation Catalysts

Suitable hydrogenation catalysts or catalyst precursors in step b) of the process of the invention are any of the salts and/or complexes of ruthenium or of rhodium which under the reaction conditions used, i.e. partial pressure of hydrogen, reaction temperature, pH of the reaction mixture, and also any coligands which may be present (or any organic or inorganic compounds acting as coligands) can form low-molecular-weight species active for hydrogenation purposes.

Salts of ruthenium and of rhodium which are suitable for this purpose are described in DE-A 197 53 302. Examples of suitable salts are their hydrides, oxides, sulfides, nitrates, sulfates, halides, e.g. chlorides, carboxylates, e.g. acetates, propionates, hexanoates or benzoates, sulfonates and also mixed salts, i.e. salts with differing anions, e.g. oxide chlorides. Other suitable salts are those of complex ions of ruthenium and/or of rhodium, for example the salts of oxyacids of ruthenium and/or of rhodium, the salts of haloruthenates or of halorhodates, in particular the chlororuthenates or chlororhodates, the amine and aquo complexes of ruthenium halides or of rhodium halides, in particular of the chlorides, and also the salts of nitroruthenates. Examples of the abovementioned salts and complex salts are ruthenium(III) chloride, ruthenium(III) nitrosyl chloride, ammonium pentachloroaquoruthenate(III), hexamineruthenium(II) and -(III) chloride, dichlorobis(2,2'-dipyridyl)ruthenium(II), tris(2,2'-dipyridyl)ruthenium(II) chloride, pentaaminechlororuthenium(III) chloride, potassium pentachloronitrosylruthenium(II), ruthenium(IV) oxide, tetraacetatochlorodiruthenium(II,III), hexakisacetatotriaquo-μ-oxotrisrhodium(III) acetate, rhodium(III) chloride, rhodium(III) hydroxide, rhodium(III) nitrate, rhodium(III) sulfate, ammonium pentachloroaquorhodate(III), potassium pentachlororhodate (III), sodium hexachlororhodate(III), triaminetrichlororhodium(III), trisethylenediaminerhodium (III) chloride, rhodium(II) acetate dimer, hexakisacetatotriaquo-μ-oxotrisrhodium(III), rhodium(III) hydroxide, rhodium(IV) oxide and potassium hexanitrorhodate. Neutral complexes of ruthenium or rhodium are also suitable. It should be noted here that there are no rigid boundaries between the salts of ruthenium or of rhodium and the salt-like or neutral complexes, and the classification set out above is merely formal. Examples of neutral complexes include the 2,4-pentanedionates of ruthenium and of rhodium, for example ruthenium(III) tris-2,4-pentanedionate, rhodium(I) dicarbonyl 2,4-pentanedionate, rhodium(III) tris-2,4-pentanedionate, bisethylenerhodium(I) 2,4-pentanedionate and norbomadienerhodium(I) 2,4-pentanedionate, and the carbonyl complexes of ruthenium and of rhodium, such as dodecacarbonyltetrarhodium, hexadecacarbonylrhodium, tetracarbonyldi-μ-chlorodirhodium(I), and dodecacarbonyltriruthenium.

In a preferred embodiment, suitable complexes of ruthenium are those of the formula

$$RuX^1X^2(CO)_k(L^1)_l(L^2)_2$$

with organophosphorus compounds, where

X$^1$ and X$^2$, independently of one another, are hydrogen, halide, preferably chloride, the anion of a carboxylic acid, e.g. acetate, benzoate or hexanoate, or of a sulfonic acid, e.g. phenylsulfonate, acetylacetonate, or phenyl, unsubstituted or substituted, K and l, independently of one another, are 0, 1 or 2, with the proviso that k+l=1 or 2, L$^1$ has been selected from carbonyl, pyridine, benzonitrile, dibenzophosphole, cycloolefins and any ligand of the formula PR$_3$, where R is alkyl, alkyloxy, cycloalkyl, cycloalkyloxy, aryl, preferably phenyl, unsubstituted or substituted, or aryloxy, and L$^2$ is PR$_3$ and (L$^2$)$_2$ may also be R$_2$P—A—PR$_2$, where R is as defined above and A is alkylene or arylene.

In this context, alkyl may be linear or else branched alkyl, preferably having from 1 to 12 carbon atoms and particularly preferably having from 1 to 4 carbon atoms, e.g. methyl, ethyl, n-propyl, isopropyl, n-butyl, isobutyl, tert-butyl, n-hexyl, 2-ethylhexyl or n-decyl. Alkoxy is generally C$_1$–C$_{12}$-alkyloxy, e.g. methoxy, ethoxy, n-propoxy, isopropoxy, n-butoxy, 2-butyloxy, tert-butoxy, n-hexyloxy or 2-ethylhexyloxy. The alkyl radical may moreover have hydroxyl functions or amino functions, or have interruptions by one or more nonadjacent oxygen atoms or imino groups. Examples of radicals of this type are 2-hydroxyethyl, hydroxypropyl, 2-aminoethyl, 5-hydroxy-3-oxopentyl. Examples of aryl are phenyl and naphthyl, which may have each one or more substituents. Suitable substituents are halogen, e.g. chloride, alkyl, preferably $C_1$–$C_4$-alkyl, alkyloxy, preferably $C_1$–$C_4$-alkyloxy, and hydroxy, which may where appropriate have been ethoxylated. Preferred aryl is phenyl, o-, m- or p-tolyl, p-chlorophenyl, p-tert-butylphenyl or p-hydroxyphenyl, which may also have been ethoxylated (EO number: 1 to 50). Alkylene is preferably 1,2-ethylene or 1,2- or 1,3-propylene, these being unsubstituted or substituted, and/or part of a carbocycle or of a heterocycle. Arylene is preferably o-phenylene, o,o-diphenylene or (o,o-diphenylene)methane.

Examples of ligands $PR_3$ are triphenylphosphine, triisopropylphosphine, tris-n-butylphosphine, tris-n-octylphosphine, tricyclohexylphosphine, trianisylphosphane, tri(p-tolyl)phosphine, triethyl phosphite and tri-n-butyl phosphite.

Suitable complexes of rhodium are rhodium-phosphine complexes of the formula $$RhX_mL^3L^4(L^5)_n$$

where

X is halide, preferably chloride or bromide, the anion of a carboxylic acid, acetylacetonate, aryl- or alkylsulfonate, hydride or the diphenylhydrazineanion, $L^3$, $L^4$ and $L^5$, independently of one another, are CO, olefins, cycloolefins, dibenzophosphole, benzonitrile, $PR_3$ or $R_2P$—A—$PR_2$, m is 1 or 2, and n is 0, 1 or 2, with the proviso that at least one of the ligands $L^3$, $L^4$ or $L^5$ is one of the abovementioned phosphorus-containing ligands of the formula $PR_3$ or $R_2P$—A—$PR_2$.

X is preferably hydride, chloride, bromide, acetate, tosylate, acetylacetonate or the diphenyltriazineanion, particularly preferably hydride, chloride or acetate.

Examples of suitable phosphine complexes of ruthenium or of rhodium are:
carbonylchlorohydridobis(tricyclohexylphosphine)ruthenium(II),
carbonylchlorohydridobis(triisopropylphosphine)ruthenium(II),
carbonylchlorohydridobis(triphenylphosphine)ruthenium(II),
carbonylchlorohydridobis(tricyclohexylphosphine)ruthenium(II),
carbonylstyrylbis(tricyclohexylphosphine)ruthenium(II),
carbonylstyrylbis(triisopropylphosphine)ruthenium(II),
carbonylchlorobenzoatobis(trip henylphosphine)ruthenium(II),
dichlorotris(triphenylphosphine)ruthenium(II),
bis(triphenylphosphine)ruthenium dicarbonyl chloride,
acetatohydridotris(triphenylphosphine)ruthenium(II),
chlorotris(triphenylphosphine)rhodium(I),
hydridotetrakis(triphenylphosphine)rhodium(I),
hydridotris(dibenzophosphole)rhodium(I).

The hydrogenation activity of the abovementioned ruthenium salts and rhodium salts, and also of the complexes, may in principle be raised by adding phosphorus-containing compounds capable of forming at least one coordinative bond between the phosphorus atom and the transition metal.

The phosphorus-containing compounds are preferably those selected from compounds of the formulae $PR_3$ and $R_2P$—A—$PR_2$, where the radicals R may be identical or different and, independently of one another, are alkyl, cycloalkyl, aryl, alkyloxy, cycloalkyloxy, aryloxy or fluoro, and A is a bivalent hydrocarbon radical.

Examples of suitable phosphorus-containing compounds are the abovementioned compounds of the formulae $PR_3$ and $R_2P$—A—$PR_2$, and also trifluorophosphane, dibenzophosphole, etc. Compounds of this type may also have been modified to give them still further atoms or atomic groups suitable for coordination with the metal atom, for example amino groups or imino groups, e.g. oxazoline or imidazoline groups. The way in which phosphorous-containing compounds of this type work can probably be explained by their promoting the formation of hydrogenation-active species from the respective ruthenium precursor or rhodium precursor used. Preferred phosphorus-containing compounds are compounds of the formulae $PR_3$ and $R_2P$—A—$PR_2$, where the radicals R may be identical or different and, independently of one another, are alkyl, cycloalkyl, aryl, alkyloxy, cycloalkyloxy, aryloxy or fluoro, and A is a bivalent hydrocarbon radical.

In one preferred embodiment of the present invention, the hydrogenation catalysts used comprise salts and/or complexes of ruthenium. These are preferably used with the abovementioned phosphorus-containing compounds, in particular with compounds of the general formulae $PR_3$ and/or $R_2P$—A—$PR_2$. In this case, the phosphorus-containing compounds are particularly preferably selected from triisopropylphosphine, tri-n-butylphosphine, tris-n-octylphosphine, tricyclohexylphosphine, triphenylphosphine, trisanisylphosphine and tris(p-tolyl)phosphine.

In one very particularly preferred embodiment of the process of the invention, a catalyst system is used which comprises at least one of the abovementioned pentanedionates of ruthenium, preferably ruthenium(III) tris-2,4-pentanedionate, and at least one compound of the formula $PR_3$ and/or $R_2P$—A—$PR_2$, preferably trisisopropylphosphine, tri-n-butylphosphine, tricyclohexylphosphine and/or triphenylphosphine.

The molar ratio of phosphorus-containing compound to metal atom is generally within the range from 1:2 to 40:1, preferably from 1:1 to 20:1, and in the case of a combination of a ruthenium pentanedionate with a phosphorus-containing compound is generally within the range from 1:2 to 20:1, preferably from 2:1 to 10:1. It is preferable for the preparation of catalyst systems of this type, prior to their use in the hydrogenation reaction, to be carried out by mixing the components together, if desired with heating, generally at from 50 to 150° C., in a suitable solvent and, where appropriate, under hydrogen pressure, generally of from 1 to 20 bar. Examples of solvents which may be used are aromatic hydrocarbons, such as benzene, toluene, xylene, chlorobenzene, anisole, cumene, ethers, such as diethyl ether, tetrahydrofuran, dioxane, amides, such as dimethylformamide, N-methylpyrrolidone, dimethyl sulfoxide, alcohols, such as methanol, ethanol, n-propanol, isopropanol, n-butanol, tert-butanol, or ketones, such as acetone or methyl ethyl ketone.

Hydrogenation Process

A way in which the hydrogenation is carried out is generally such that one of the abovementioned hydrogenation catalysts or catalyst precursors, and also, where appropriate, one or more coligands, e.g. the abovementioned phosphorus-containing compounds, where appropriate dissolved in an organic solvent, is added to the dispersion of the elastomeric polymer from step a). Where appropriate, the dispersion is prepared by dilution with water or with a water-emulsifier mixture, or with a water-miscible organic solvent, to a suitable solids content. The desired hydrogen pressure is then set and the materials heated to a suitable reaction temperature. One way of proceeding here is firstly, after addition of the catalyst, to set a relatively low gage pressure of hydrogen, then to heat the reaction mixture to the desired reaction temperature, and then to set that gage pressure of hydrogen which is required for the reaction. It is frequently expedient to flush the reaction vessel in advance with an inert gas, e.g. nitrogen.

Suitable preferred solvents for the dilution process include the abovementioned $C_1$–$C_4$-alkanols, ketones, such as acetone and methyl ethyl ketone, cyclic ethers, such as tetrahydrofuran or dioxane, and amides, such as N,N-dimethylformamide or N-methylpyrrolidone. It is preferable for the aqueous dispersion (hydrogenation mixture), insofar as this is required, to be diluted exclusively with water or with an aqueous emulsion.

The solvent content of the polymer dispersion to be hydrogenated is below 20% by weight, preferably from 0 to 10% by weight, particularly preferably from 0 to 5% by weight. It is preferable for the aqueous dispersion of the elastomeric polymer, insofar as this is required, to be diluted exclusively with water or with a water-emulsifier solution. There is no requirement for any swelling of the elastomeric polymer in an organic solvent, or for the preparation of a solution of the elastomeric polymer in an organic solvent, in order to carry out the hydrogenation in step b) of the process of the invention.

However, it frequently proves expedient, in particular when using coligands, such as the abovementioned phosphorus-containing compounds, to combine the respective desired ruthenium and/or rhodium compound with the coligand in a suitable solvent, and to add the resultant solution or suspension to the dispersion of the elastomeric polymer. Where appropriate, before this solution or suspension is added to the dispersion of the elastomeric polymer, it is reacted with hydrogen or with another reducing agent, e.g. with hydrogen at pressures within the range from 1 to 20 bar and temperatures within the range from 50 to 150° C., whereupon the catalytically active species is formed. The activation may also take place in situ, i.e. in the dispersion of the elastomeric polymer.

The hydrogenation generally takes place at a hydrogen partial pressure within the range from 0.5 to 600 bar, preferably from 50 to 400 bar, particularly preferably from 100 to 300 bar. The reaction temperatures is generally within the range from 20 to 250° C., preferably from 50 to 200° C., particularly preferably from 100 to 180° C. Depending on the nature of the catalyst system and on the desired conversion, the amounts of catalyst used are within the range from 1 to 1000 ppm of ruthenium and/or rhodium, based on the total weight of the polymer dispersion to be hydrogenated, preferably from 5 to 500 ppm. The reaction time is generally within the range from 1 to 30 hours, preferably from 2 to 25 hours, particularly preferably from 3 to 20 hours.

Depending on the desired properties of the hydrogenated polymer, the reaction may be conducted as far as a particular conversion, which can be set in a known manner via selection of the reaction parameters, such as hydrogen pressure and temperature, and also the nature and amount of the catalyst system used. One way of determining conversion is IR spectrometry, by monitoring the bands within the range from 900 to 1000 cm$^{-1}$ typical of ethylenically unsaturated double bonds.

A feature of the hydrogenated polymer dispersions is that the ethylenic double bonds of the polymers present therein have been selectively hydrogenated, even in the presence of other double bonds susceptible to hydrogenation, such as aromatic carbon—carbon double bonds, carbonyl groups, nitrile functions, etc. Partial hydrogenation of the carbon—carbon double bonds present in the elastomeric polymer is also possible. It is preferable here for from 20 to 99%, particularly preferably from 50 to 95%, of the carbon—carbon double bonds to have been hydrogenated.

These polymers obtained following the hydrogenation (step b) form one graft core of the graft polymers prepared by the process of the invention. By preparing a (partially) hydrogenated graft core from diene polymers, it is possible to prepare graft polymers whose resistance to environmental influences, such as light, oxygen and/or elevated temperature, is high and markedly better than that obtained using non-hydrogenated diene-based graft cores.

One particularly preferred embodiment provides the hydrogenation of aqueous dispersions of elastomeric polymers prepared from styrene-butadiene. Polymer dispersions which comprise butadiene and styrene incorporated into the polymer are preferably prepared by free-radical emulsion polymerization and are important graft bases for large-scale industrial products.

The (partially) hydrogenated polymers which are obtained following the hydrogenation and which serve as graft base and which are obtainable from elastomeric polymers prepared from styrene and/or α-methylstyrene as copolymerizable monomer and from butadiene and/or isoprene as conjugated diene are essentially composed of the structural units I, II, III, IV and V, the structural units IV and V occurring in the event of partial hydrogenation of the elastomeric polymers prepared in step a).

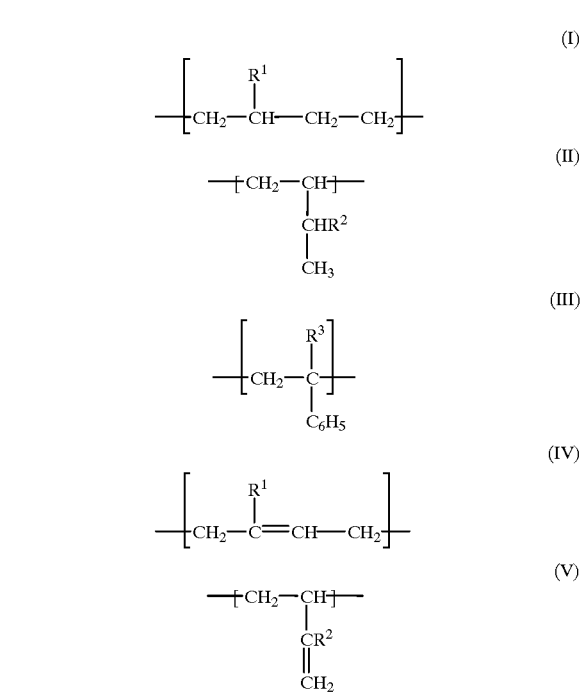

$R^1$, $R^2$ and $R^3$, independently of one another, are hydrogen or methyl.

$R^1$ and $R^2$ are preferably hydrogen. These polymers (graft core) generally have from 50 to 98 mol % of the structural units I, II, IV and V, and from 2 to 50 mol % of the structural units III, based in each case on the total number of moles of structural units I, II, III, IV and V. The structural units I and II are present at from 20 to 99 mol % here, based on the total number of moles of I+II+IV+V, and this corresponds to a degree of hydrogenation of from 20 to 99%, the polymer being (virtually) completely hydrogenated if 99 mol % of the structural units I and II are present, based on the total number of moles of I+II+IV+V.

The polymers (graft core) may also contain structural units of the formula VI

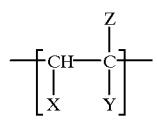
(VI)

where X has been selected from hydrogen, COOH and $CH_2$—COOH and Y has been selected from COOH, $CONH_2$, CONH—$CH_2OH$, and Z has been selected from hydrogen, $CH_3$, and can also be $CH_2COOH$ if X=H. If Z=H or methyl, furthermore, X and Y can also be —C(O)—O—C(O)— or —C(O)—N(R)—C(O)—, where R is hydrogen, $C_1$–$C_6$-alkyl or aryl. Structural units of the formula VI result from the modified monomers in the elastomeric polymers of the starting dispersion (step a). The molar proportion of the structural unit VI is preferably within the range from 0.05 to 10 mol %, based on the total number of moles of the structural units I, II, III, IV and V.

The polymers (graft core) may also contain structural units of the formula VII

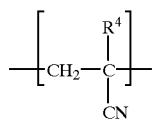
(VII)

where $R^4$ is hydrogen or methyl, preferably hydrogen. Structural units VII result from acrylonitrile or methacrylonitrile incorporated into the elastomeric polymers of the starting dispersion (step a). The proportion of structural units of the formula VII may be up to 40 mol %, based on the total number of moles of the structural units I, II, III, IV and V, preferably from 0.5 to 35 mol %.

c) Grafting of at Least One Graft Shell onto the Graft Core

At least one graft shell is grafted onto the graft core obtained following the hydrogenation (step b).

The proportion of the graft shell present is from 10 to 70% by weight, preferably from 20 to 60% by weight, particularly preferably from 25 to 50% by weight, based on the graft rubber, the entirety of graft core and graft shell being 100% by weight.

Monomers

The graft shell is obtained by polymerizing a monomer mixture made from, based on the proportion by weight in the graft shell, from 10 to 100% by weight, preferably from 60 to 95% by weight, particularly preferably from 65 to 85% by weight, of a styrene compound of the formula I

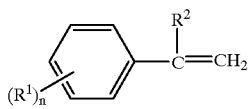
(I)

where $R^1$ and $R^2$ are hydrogen or $C_1$–$C_8$-alkyl, and n is 0, 1, 2 or 3, from 0 to 90% by weight, preferably from 0 to 40% by weight, particularly preferably from 5 to 35% by weight, of at least one monoethylenically unsaturated nitrile compound or of (meth)acrylates, and from 0 to 40% by weight, preferably from 0.5 to 20% by weight, of one or more other monomers, and from 0 to 5% by weight of at least one crosslinker and/or regulator.

In one preferred embodiment of the present invention, the graft shell is obtained by polymerizing a monomer mixture made from, based on the proportion by weight in the graft shell, from 60 to 90% by weight of styrene, and from 10 to 40% by weight of acrylonitrile.

In another preferred embodiment, the graft shell is obtained by polymerizing a monomer mixture made from, based on the proportion by weight in the graft shell, from 10 to 80% by weight, particularly preferably 20% by weight, of styrene, and from 20 to 90% by weight, particularly preferably 80% by weight, of methyl methacrylate.

Styrene Compound

The styrene compound used of the general formula I preferably comprises styrene, α-methylstyrene, or else other ring-$C_1$–$C_8$-alkyl-alkylated styrenes, such as p-methylstyrene or tert-butylstyrene. Styrene is particularly preferred.

Monoethylenically Unsaturated Nitrile Compound and/or (Meth)acrylates

Monoethylenically unsaturated nitrile compounds which may be used are acrylonitrile, methacrylonitrile and mixtures of these, particularly preferably acrylonitrile. Suitable (meth)acrylates are $C_1$–$C_8$ acrylates and $C_1$–$C_8$ methacrylates.

Other Comonomers

The graft shell may also be composed of other comonomers, with concomitant reduction in the amounts of the styrene monomers and the monoethylenically unsaturated nitrile compounds and/or (meth)acrylates. These other comonomers may have been selected from acrylic acid, methacrylic acid, and also dicarboxylic acids, such as maleic acid and fumaric acid, and also anhydrides of these, such as maleic anhydride, N-substituted maleimides, such as N-methyl-, N-phenyl- and N-cyclohexylmaleimide, nitrogen-functional monomers, such as dimethylaminoethyl acrylate, diethylaminoethyl acrylate, vinylimidazole, vinylpyrrolidine vinylcaprolactam, vinylcarbazole, vinylaniline and acrylamide, $C_1$–$C_4$-alkyl methacrylates, such as methyl methacrylate, ethyl methacrylate, n-propyl methacrylate, isopropyl methacrylate, n-butyl methacrylate, isobutyl methacrylate, sec-butyl methacrylate, tert-butyl methacrylate and hydroxyethyl acrylate, aromatic or araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate, unsaturated ethers, such as vinyl methyl ether, and also mixtures of these monomers. Preference is given to maleic anhydride and N-substituted maleimides, such as N-methyl-, N-phenyl- and N-cyclohexylmaleimide.

Crosslinkers

Suitable crosslinkers are crosslinkers which have at least two nonconjugated, ethylenically unsaturated double bonds. Suitable monomers having at least two nonconjugated, ethylenically unsaturated double bonds are those selected from diesters of dihydric alcohols with ethylenically unsaturated monocarboxylic acids, e.g. alkylene glycol diacrylates and dimethacrylates, such as ethylene glycol di(meth)acrylate, butylene 1,3-glycol di(meth)acrylate, butylene 1,4-glycol di(meth)acrylate, propylene glycol di(meth)acrylate, and also divinylbenzene, vinyl methacrylate, vinyl acrylate, allyl methacrylate, allyl acrylate, diallyl maleate, diallyl fumarate, diallyl phthalate, methylenebisacrylamide, dihydrodicyclopentadienyl acrylate and dihydrodicyclopentadienyl methacrylate, N,N'-divinylimidazolin-2-one and triallyl cyanurate.

Crosslinkers whose use is particularly preferred are acrylic acid, methacrylic acid, itaconic acid, acrylamide, methacrylamide, N-methylolacrylamide and/or N-methylolmethacrylamide.

The graft shell is preferably composed of styrene or of a mixture made from 60 to 90% by weight of styrene, the remainder being acrylonitrile, or made from 10 to 30% by weight of styrene and from 70 to 90% by weight of methyl methacrylate.

Preparation of the Graft Polymers

The graft shell may be prepared under conditions identical with those for preparing the elastomeric polymer (step a), and the shell here may be prepared in one or more steps. For example, styrene and/or a-methylstyrene may first be polymerized alone, and then styrene and acrylonitrile polymerized, in two steps in succession.

The graft polymers are obtainable in a manner known per se, preferably by emulsion polymerization at from 30 to 80° C. Examples of emulsifiers suitable for this purpose are alkali metal salts of alkyl- or alkylarylsulfonic acids, alkyl sulfates, fatty alcohol sulfates, salts of higher fatty acids having from 10 to 30 carbon atoms, sulfosuccinates, ethersulfonates or resin soaps. It is preferable to use the alkali metal salts of alkylsulfonates or fatty acids having from 10 to 18 carbon atoms.

To prepare the dispersion it is preferable to use an amount of water sufficient to give the final dispersion a solids content of from 20 to 60% by weight.

Preferred polymerization initiators are free-radical generators, e.g. peroxides, preferably peroxosulfates, such as potassium peroxodisulfate, and azo compounds, such as azobisisobutyronitrile. However, it is also possible to use redox systems, in particular those based on hydroperoxides, such as cumene hydroperoxide. Concomitant use may also be made of molecular weight regulators, such as ethylhexyl thioglycolate, tert-dodecyl mercaptan, terpinols or dimeric α-methylstyrene.

To maintain a constant pH, preferably from 6 to 9, concomitant use may be made of buffer substances, such as $Na_2HPO_4/NaH_2PO_4$ or sodium hydrogencarbonate.

Emulsifiers, initiators, regulators and buffer substances are used in the usual amounts, and further details in this connection are therefore unnecessary.

Further details of the preparation of graft polymers are described in DE-A 12 60 135 and DE-A 31 49 358.

The reaction conditions are preferably balanced in a manner known per se so that the particulate graft polymers have a diameter $d_{50}$ within the range from 60 to 1500 nm, preferably from 90 to 1000 nm and particularly preferably from 30 to 700 nm.

The graft polymers may also be composed of two or more "hard" and "soft" shells, where a graft core ("soft") is followed, for example, by a graft shell ("hard") and again by a graft core and another graft shell, or where the monomers of the graft shell form an inner core, which is followed by the graft core and again the graft shell.

The present invention further provides a graft rubber which can be prepared by the process of the invention. Compared with other graft rubbers prepared from dienes, this graft rubber has higher resistance to environmental influences, for example lightfastness and temperature resistance.

The graft rubber of the invention is particularly suitable for use as an impact modifier in thermoplastic blends. For the purposes of the present invention, thermoplastic blends are blends of the graft rubber of the invention with thermoplastic polymers. These thermoplastic polymers (hard components) are generally prepared separately, and the graft polymer of the invention is admixed as impact modifier.

The present invention therefore also provides blends comprising a) from 2 to 70% by weight of a graft rubber of the invention, as component A, b) from 30 to 98% by weight of a thermoplastic polymer or of a mixture of various thermoplastic polymers, as component B, and c) from 0 to 50% by weight of other additives, as component C, where the entirety of components A to C is 100% by weight, based on the blend.

Component B

Any thermoplastically processable plastic or mixture of these is suitable. Preferred suitable thermoplastic polymers are those selected from acrylonitrile-butadiene-styrene styrene (ABS), acrylonitrile-styrene-acrylate (ASA), polybutylene terephthalate or polyethylene terephthalate (PBT or PET), polyvinyl chloride (PVC), polystyrene-acrylonitrile (SAN) and/or methyl methacrylate-ABS (MABS), polypropylene (PP), polycarbonates (PC), polystyrene (PS), polymethyl methacrylate (PMMA), polyoxymethylene (POM), polyamides (PA), polyethylene, thermoplastic urethanes (TPU), and the mixtures PC/SAN, PBT/SAN, PA/SAN, SAN/PMMA/(where appropriate) PC and PA/ABS. Preference is given to SAN, PC/SAN, PA/SAN, PA/ABS.

These thermoplastic polymers may be obtained by processes known to the skilled worker, e.g. by polymerization in bulk, in solution, suspension or emulsion.

Component C

Other additives are conventional additives, such as pigments, dyes, fillers, flame retardants, other compatible polymers, antistats, antioxidants, mold-release agents and lubricants.

Processes for Preparing the Blends

The blends of the invention may be prepared by mixing components A to C at from 100 to 350° C., with melting, in a mixing apparatus. It is also possible here for two components first to be mixed and then other components as appropriate to be added progressively. The blends are usually prepared in an extruder or kneader.

The blends of the invention are used to produce moldings, films or fibers. The excellent resistance of the blends to environmental influences makes them particularly suitable for outdoor applications.

The invention is illustrated further by the examples below.

EXAMPLES

1. Preparation of the Elastomeric Polymers a) Preparation of Elastomeric Polymer (A1a)

The following substances form an initial charge in a V2A steel vessel fitted with blade stirrer and designed for a gage pressure of 10 atmospheres:

| | |
|---|---|
| 150 parts by weight | of water |
| 1.2 parts by weight | of sodium alkyl(C12–C16)sulfonate (K30, Bayer AG) |
| 0.3 part by weight | of potassium persulfate |
| 0.3 part by weight | of sodium bicarbonate |
| 0.15 part by weight | of sodium pyrophosphate. |

To remove any oxygen present, the vessel was flushed twice with nitrogen, and the solution was then heated to 65° C under nitrogen. 0.5 part by weight of tert-dodecyl mercaptan and 16.6 parts by weight of butadiene were then fed to the solution. One hour after the start of polymerization, a further 83.3 parts by weight of butadiene were metered in within a period of 5 hours. 5 hours after butadiene addition had ended, i.e. after a total of 11 hours, a further 0.5 part of tert-dodecyl mercaptan was added. After a total reaction time of 19 hours, the conversion was 96% and the polybutadiene emulsion obtained had a solids content of 39.2%, based on the emulsion. The polybutadiene latex had a median particle size of 0.08 μm ($d_{50}$ of the cumulative mass distribution, determined using an ultracentrifuge). The dispersion is diluted to 25% with 150 parts by weight of water and 0.8 part of soap.

b) Preparation of the Elastomeric Polymer (A1b)

The following substances formed an initial charge in a 14 l reactor:

| | |
|---|---|
| 0.28 kg | of a polystyrene seed (particle size 29 mm, determined by static light scattering) |
| 7.21 | of water |
| 0.0096 kg | of sodium hydrogensulfate |
| 0.019 kg | of potassium persulfate |
| 0.01 kg | of Texapon ® NSO IS (from Henkel KGaA) |
| 0.0053 kg | of sodium pyrophosphate |
| 10% by weight | of a feed of the following composition |
| Feed | |
| 2.2 kg | of butadiene |
| 0.55 kg | of styrene |
| 0.04 kg | of K30 (soap) |
| 0.04 kg | of Texapon ® NSO IS (from Henkel KGaA) |
| 0.243 kg | of water. |

The initial charge was heated under nitrogen to 67° C. The remainder of the feed was then fed to the reaction mixture within a period of 5 hours. The reaction mixture was then allowed to continue reacting for 10 hours. This gave a polybutadiene emulsion with a solids content of 25%, based on the emulsion.

c) Preparation of Elastomeric Polymer (A1c)

The following substances formed an initial charge in a 14 l reactor:

| | |
|---|---|
| 0.28 kg | of a polystyrene seed (particle size 29 mm, determined by static light scattering) |
| 7.21 | of water |
| 0.0096 kg | of sodium hydrogensulfate |
| 0.019 kg | of potassium persulfate |
| 0.01 kg | of Texapon ® NSO IS (from Henkel KGaA) |
| 0.0053 kg | of sodium pyrophosphate |
| 10% by weight | of a feed of the following composition |
| Feed | |
| 2.8 kg of butadiene | |
| 0.04 kg of K30 (soap) | |
| 0.04 kg of Texapon ® NSO IS (from Henkel KGaA) | |
| 0.243 kg of water. | |

The initial charge was heated under nitrogen to 67° C. The remainder of the feed was then fed to the reaction mixture within a period of 5 hours. The reaction mixture was then allowed to continue reacting for 10 hours. This gave a polybutadiene emulsion with a solids content of 25%, based on the emulsion.

2. Preparation of the Hydrogenated Graft Base (Hydrogenation of the Elastomeric Polymers)

a) Hydrogenation of the Elastomeric Polymer and Preparation of the Hydrogenated Graft Base (A2a)

a1) Preparation of the Catalyst Solution 100 g of toluene, 5.0 g of ruthenium(III) tris-2,4-pentanedionate and 10.15 g of tris-n-butylphospine formed an initial charge in a 0.3 l autoclave under argon. 5 bar of hydrogen pressure were then applied to the autoclave at room temperature followed by heating to 100° C. and raising the hydrogen pressure to 10 bar. The hydrogen pressure and temperature were maintained for 2 hours, then the reaction mixture was cooled and transferred into an inert storage vessel.

a2) Hydrogenation

Under inert gas conditions, 45.4 g of the catalyst solution prepared as in a1) were added, with intensive mixing, to 1 kg of the dispersion of the elastomeric polymer A1a. This mixture was transferred into a 2.5 l autoclave which had been inertized in advance by repeated evacuation and charging with nitrogen. 10 bar of hydrogen were then applied to the autoclave at room temperature followed by heating to 150° C. and the raising the hydrogen pressure to 280 bar. The hydrogen pressure and temperature were maintained for 15 hours. The degree of hydrogenation of the double bonds was determined by IR spectroscopy as 96%.

b) Hydrogenation of the Elastomeric Polymer and Preparation of the Hydrogenated Graft Base (A2b)

b1) Preparation of the Catalyst Solution

The catalyst solution used, and its preparation, were the same as for the catalyst solution prepared under a1).

b2) Hydrogenation

The preparation of hydrogenated graft base (A2b) was based on the preparation described under a2) for hydrogenated graft base (A2a). The degree of hydrogenation of the double bonds was determined by IR spectroscopy as 86%.

c) Hydrogenation of the Elastomeric Polymer and Preparation of the Hydrogenated Graft Base (A2c)

c1) Preparation of the Catalyst Solution

The catalyst solution used, and its preparation, were the same as for the catalyst solution prepared under a1).

c2) Hydrogenation

The preparation of hydrogenated graft base (A2c) was based on the preparation described under a2) for hydrogenated graft base (A2a). The degree of hydrogenation of the double bonds was determined by IR spectroscopy as 95%.

3. Preparation of the Graft Polymers (Grafting of the Hydrogenated Graft Base) (Examples 1, 2 and 3)

a) Grafting of the Hydrogenated Elastomeric Polymer and Preparation of the Graft Polymer (A3a) of the Invention (Example 1)

150 parts of the latex of the hydrogenated graft base (A2a) were mixed with 40 parts of a mixture made from styrene and acrylonitrile (ratio 70:30) and with 110 parts of water and heated to 65° C for 4 hours, with stirring, after addition of 0.03 part of potassium persulfate and 0.05 part of lauroyl peroxide. The polymerization product obtained in the graft copolymerization was then precipitated from the dispersion by means of a magnesium sulfate solution at 95° C., isolated, washed with water and dried in a stream of warm air.

b) Grafting of the Hydrogenated Elastomeric Polymer and Preparation of the Graft Polymer (A3b) of the Invention (Example 2)

The grafting of hydrogenated graft base (A2b) was based on the grafting of hydrogenated graft base (A2a)(3a)).

c) Grafting of the Hydrogenated Elastomeric Polymer and Preparation of the Graft Polymer (A3c) of the Invention (Example 3)

The grafting of hydrogenated graft base (A2c) was based on the grafting of hydrogenated graft base (A2a)(3a)).

Comparative Examples (Comparative Examples 4 to 6)

a) Grafting of the Elastomeric Polymer (A1a) without Previous Hydrogenation (Comparative Example 4)

The elastomeric polymer (A1a) was grafted without previous hydrogenation, the grafting of the unhydrogenated elastomeric polymer (A1a) being based on the grafting of hydrogenated elastomeric polymer (hydrogenated graft base) (A2a).

b) Grafting of the Elastomeric Polymer (A1b) without Previous Hydrogenation (Comparative Example 5)

The elastomeric polymer (A1b) was grafted without previous hydrogenation, the grafting of the unhydrogenated elastomeric polymer (A1b) being based on the grafting of hydrogenated elastomeric polymer (hydrogenated graft base) (A2b).

c) Grafting of the Elastomeric Polymer (A1c) without Previous Hydrogenation (Comparative Example 6)

The elastomeric polymer (A1c) was grafted without previous hydrogenation, the grafting of the unhydrogenated elastomeric polymer (A1c) being based on the grafting of hydrogenated elastomeric polymer (hydrogenated graft base) (A2c).

The intrinsic color of the (partially) hydrogenated graft rubbers after precipitation using a 2% strength $MgSO_4$ solution followed by drying for 24 hours at 80° C. is markedly paler than the intrinsic color of the unhydrogenated graft rubbers.

Further Processing/Blending with SAN (poly(styrene-co-acrylonitrile))

The graft rubbers were precipitated using a 2% strength $MgSO_4$ solution and then dried for 24 hours at 80° C. The dried graft rubbers were then mixed at 250° C. with SAN (33% by weight of acrylonitrile) and processed to give pellets. The pellets were subjected to heat aging at 110° C. and, respectively, injection molded to give standard small specimens (50×6×4 mm). The mechanical properties of the moldings were determined to DIN 53455. Table 1 shows a list of mechanical properties of selected blends, and Table 2 shows an evaluation of color after heat aging at 110° C.

TABLE 1

| Graft rubber % by weight | % by weight of SAN | Tensile stress [MPa][1] | Vicat B [° C.][2] |
| --- | --- | --- | --- |
| Example 1 (A3a) 46 | 54 | 33.3 | 92.3 |
| Comparative Example 4 46 | 54 | 22.5 | 90.6 |

[1]Tensile stress is determined to DIN 53455
[2]Vicat B is determined to VST/B ISO 306

TABLE 2

| Graft rubber % by weight | % by weight of SAN | Color change after 288 h |
| --- | --- | --- |
| Example 2 (A3b) 58 | 42 | ++[1] |
| Comparative Example 5 58 | 42 | --[2] |
| Example 3 (A3c) 46 | 54 | ++ |
| Comparative Example 6 46 | 54 | -- |

[1]only slight color change ++
[2]very pronounced color change --

We claim:

1. A process for preparing graft rubbers built up from at least one graft core and from at least one graft shell, comprising
   a) preparing an aqueous dispersion of at least one elastomeric polymer built up from
      at least one conjugated diene,
      optionally, at least one monomer copolymerizable with the diene, and
      optionally, at least one modifying monomer,
   b) then, to obtain the at least one graft core, selectively hydrogenating ethylenically unsaturated double bonds in the elastomeric polymer, using hydrogen, in the presence of at least one hydrogenation catalyst selected from the group consisting of salts and complexes of rhodium, salts and complexes of ruthenium and salts and complexes of rhodium and ruthenium, where the aqueous dispersion of the elastomeric polymer comprises not more than 20% by volume of an organic solvent, and
   c) grafting onto the graft core at least on graft shell built up from
      at least one styrene compound of the formula I

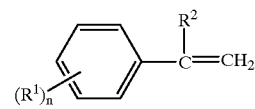

(I)

where $R^1$ and $R^2$ are hydrogen or $C_1$–$C_8$-alkyl and n is 0, 1, 2 or 3,
   optionally, at least one monoethylenically unsaturated nitrile compound, and
   optionally, at least one other monomer.

2. A process as claimed in claim 1, wherein the graft rubber contains from 30 to 90% by weight of the elastomeric graft core and from 10 to 70% by weight of the graft shell, where the entirety of graft core and graft shell gives 100% by weight, based on the graft rubber, and where the graft core and the graft shell optionally are composed of two or more graft cores and graft shells.

3. A process as claimed in claim 1, wherein the elastomeric polymer has been built up from the following components:

from 10 to 100% by weight of at least one conjugated diene, from 5 to 80% by weight of at least one monomer copolymerizable with the diene, and from 0 to 20% by weight of at least one modifying monomer, where the entirety of the components gives 100% by weight, based on the elastomeric polymer.

4. A process as claimed in claim 1, wherein the conjugated diene has been selected from butadiene and isoprene.

5. A process as claimed in claim 1, wherein the hydrogenation catalyst used comprises a complex of ruthenium.

6. A process as claimed in claim 1, wherein the amount of the hydrogenation catalyst used is from 1 to 1000 ppm, based on the total weight of the aqueous dispersion.

7. A process as claimed in claim 1, wherein the graft shell has been built up from the following components:

from 10 to 100% by weight of at least one styrene compound of the formula I, from 0 to 90% by weight of at least one compound selected from the group consisting of monoethylenically unsaturated nitrile compound and (meth) acrylates, and from 0 to 40% by weight of at least one other monomer, and from 0 to 5% by weight of at least one crosslinker or regulator or the continuation thereof, where the entirety of the components gives 100% by weight, based on the graft shell.

8. A graft rubber which is prepared by a process of claim 1.

9. A method of using a graft rubber as claimed in claim 8 as impact modifier in thermoplastic blends.

10. A blend comprising a) from 2 to 70% by weight of a graft rubber as claimed in claim 8, as component A, b) from 30 to 98% by weight of a thermoplastic polymer or of a mixture of various thermoplastic polymers, as component B, and c) from 0 to 50% by weight of other additives, as component C, where the entirety of components A to C is 100% by weight, based on the blend.

11. A process for preparing blends as claimed in claim 10, which comprises mixing components A to C at from 100 to 350° C., with melting, in a mixing apparatus.

12. A method of using blends as claimed in claim 10 for producing moldings, films or fibers.

13. A process for preparing graft rubbers built up from at least one graft core and from at least one graft shell, comprising a) preparing an aqueous dispersion of at least one elastomeric polymer built up from at least one conjugated diene, optionally, at least one monomer copolymerizable with the diene, and optionally, at least one modifying monomer, b) then, to obtain the at least one graft core, selectively hydrogenating ethylenically unsaturated double bonds in the elastomeric polymer, using hydrogen, in the presence of at least one hydrogenation catalyst selected from the group consisting of salts and complexes of rhodium, salts and complexes of ruthenium and salts and complexes of rhodium and ruthenium wherein phosphorus-containing compounds which can develop coordinative bonding with the salts or with the complexes of ruthenium or rhodium or ruthenium and rhodium are added to the hydrogenation catalyst, and where the aqueous dispersion of the elastomeric polymer comprises not more than 20% by volume of an organic solvent, and c) grafting onto the graft core at least one graft shell built up from at least one styrene compound of the formula I

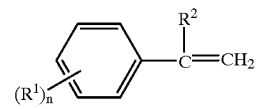

where $R^1$ and $R^2$ are hydrogen or $C_1$–$C_8$-alkyl and n is 0,1, 2 or 3, optionally, at least one monoethylenically unsaturated nitrile compound, and optionally, at least one other monomer.

14. A process as claimed in claim 13, wherein the phosphorus-containing compounds have been selected from compounds of the formulae $PR_3$ and $R_2P$—A—$PR_2$, where the radicals R may be identical or different and, independently of one another, are alkyl, cycloalkyl, aryl, alkyloxy, cycloalkyloxy, aryloxy or fluoro, and A is a bivalent hydrocarbon radical.

15. A process as claimed in claim 13, wherein the hydrogenation catalyst used comprises a complex of ruthenium.

16. A process as claimed in 1, wherein the aqueous dispersion of the elastomeric polymer comprises from 0 to 10% by weight of an organic solvent.

17. A process of claim 16, wherein the aqueous dispersion of the elastomeric polymer comprises form 0 to 5% by weight of an organic solvent.

18. A process as claimed in claim 1, wherein 50 to 95% of the ethylenically unsaturated double bonds in the elastomeric polymer are hydrogenated.

* * * * *